(12) United States Patent
Sakamoto

(10) Patent No.: US 9,346,456 B2
(45) Date of Patent: May 24, 2016

(54) TRANSMISSION CONTROL SYSTEM

(71) Applicant: HONDA MOTOR CO., LTD., Minato-ku (JP)

(72) Inventor: Naoki Sakamoto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 85 days.

(21) Appl. No.: 14/186,072

(22) Filed: Feb. 21, 2014

(65) Prior Publication Data
US 2014/0256507 A1     Sep. 11, 2014

(30) Foreign Application Priority Data

Mar. 5, 2013   (JP) ................. 2013-043375

(51) Int. Cl.
| | |
|---|---|
| B60W 10/06 | (2006.01) |
| B60W 10/11 | (2012.01) |
| B60W 10/02 | (2006.01) |
| B60W 30/19 | (2012.01) |
| F16H 61/12 | (2010.01) |
| F16H 61/70 | (2006.01) |
| F16H 63/50 | (2006.01) |
| F16H 61/04 | (2006.01) |
| F16H 63/46 | (2006.01) |
| F16H 59/36 | (2006.01) |
| F16H 61/16 | (2006.01) |

(52) U.S. Cl.
CPC ............. B60W 10/11 (2013.01); B60W 10/02 (2013.01); B60W 10/06 (2013.01); B60W 30/19 (2013.01); F16H 61/0437 (2013.01); F16H 61/12 (2013.01); F16H 61/702 (2013.01); F16H 63/46 (2013.01); F16H 63/502 (2013.01); *B60W 2510/0638* (2013.01); *B60Y 2300/53* (2013.01); *F16H 2059/366* (2013.01); *F16H 2061/166* (2013.01); *Y10T 477/6403* (2015.01)

(58) Field of Classification Search
CPC ............ Y10T 477/6424; Y10T 477/70; Y10T 477/6403; Y10T 477/77
USPC ........................................................... 477/77
See application file for complete search history.

(56) References Cited

U.S. PATENT DOCUMENTS

| | | | | |
|---|---|---|---|---|
| RE36,186 | E | * | 4/1999 | White et al. ................. 477/108 |
| 6,080,085 | A | * | 6/2000 | Kosik et al. ................. 477/180 |
| 2005/0060077 | A1 | * | 3/2005 | Slayton et al. ................. 701/51 |
| 2005/0193720 | A1 | * | 9/2005 | Surnilla et al. ................. 60/285 |
| 2008/0248924 | A1 | * | 10/2008 | Kato et al. ................. 477/124 |

FOREIGN PATENT DOCUMENTS

JP     56-73252 A     6/1981

* cited by examiner

*Primary Examiner* — Justin Holmes
*Assistant Examiner* — Stacey Fluhart
(74) *Attorney, Agent, or Firm* — Squirre Patton Boggs (US) LLP

(57) ABSTRACT

A transmission control system can include a main transmission. The transmission control system can also include a sub transmission that has two forward transmission gears mechanically shiftable in response to a shift operation. The transmission control system can further include a controller that shifts the transmission gears of the main transmission by activating a shift control motor, and control the clutches configured to enable and disable transmission of a rotational driving force of an engine. When one forward transmission gear of the sub transmission is shifted to the other forward transmission gear in response to the shift operation, the controller can relax engagement of the clutch if an engine speed exceeds a clutch release speed.

9 Claims, 6 Drawing Sheets

FIG. 5

|  |  | BEFORE OPERATION | | | | |
|---|---|---|---|---|---|---|
|  |  | P | R | N | H | L |
| AFTER OPERATION | P |  | O |  | O | O |
|  | R |  |  |  | O | O |
|  | N |  | O |  | O | O |
|  | H |  | O |  |  | × |
|  | L |  | O |  | × |  |

TRANSMISSION CONTROL SYSTEM

BACKGROUND

1. Field

Embodiments of the present invention relate to a transmission control system including a main transmission and a sub transmission.

2. Description of the Related Art

Japanese Patent Application No. Sho 56-73252 (Patent Document 1) describes a device including a main transmission configured to perform a gear shift action by being manually operated and a sub transmission configured to automatically perform a gear shift action in response to an operation of a selector switch. When an engine speed is equal to or higher than a predetermined value, the device prevents an increase of the engine speed by prohibiting the sub transmission from performing a gear shift action from high to low regardless of a gear shift instruction.

SUMMARY

In the technique of Patent Document 1 described above, when the main transmission is manually operated to perform a gear shift action from high to low, this gear shift action cannot be prohibited.

In view of this, an object of the present invention is to provide a transmission control system configured to suppress an increase in an engine speed due to a gear shift action of a transmission which mechanically performs the gear shift action in response to a manual gear shift operation.

A transmission control system of certain embodiments of the present invention has the following characteristics.

In certain embodiments, the transmission control system comprises a main transmission to which a rotational driving force of an engine is transmitted via a clutch, and which has a plurality of transmission gears, a sub transmission which has at least two forward transmission gears mechanically shiftable in response to a shift operation. The transmission control system also includes a controller which shifts the transmission gears of the main transmission by activating an actuator, and which controls the clutch configured to enable and disable transmission of the rotational driving force of the engine. In the transmission control system, when one of the forward transmission gears of the sub transmission is shifted to another one of the forward transmission gears in response to the shift operation, the controller relaxes engagement of the clutch if an engine speed exceeds a clutch release speed.

In other embodiments, the controller releases the clutch regardless of the engine speed when the shift operation other than the operation to shift one of the forward transmission gears to another one of the forward transmission gears is performed.

In other embodiments, when one of the forward transmission gears of the sub transmission is shifted to another one of the forward transmission gears in response to the shift operation, the controller sets a clutch capacity of the clutch to zero if the engine speed exceeds the clutch release speed and then increases the clutch capacity along with reduction of the engine speed.

In other embodiments, the controller stops fuel injection to a cylinder of the engine when the engine speed exceeds a revolution limit speed, and stops ignition in the cylinder of the engine when the engine speed exceeds an upper limit speed. The clutch release speed, the revolution limit speed, and the upper limit speed satisfy a relationship of revolution limit speed<clutch release speed<upper limit speed.

According to certain embodiments of the present invention, when the sub transmission having the transmission gears mechanically shiftable in response to the shift operation of the shift lever 108 is shifted from one forward transmission gear to another, the engagement of the clutch is relaxed if the engine speed exceeds the clutch release speed. Accordingly, it is possible to suppress an increase of the engine speed due to a gear shift action of the sub transmission having the mechanically shiftable transmission gears.

According to other embodiments of the present invention, the clutch is released regardless of the engine speed when the shift operation other than the operation to shift one of the forward transmission gears of the sub transmission to another one of the forward transmission gears is performed. Accordingly, even when a gear shift action with a large shift shock is performed, the shift shock can be reduced.

According to other embodiments of the present invention, when one of the forward transmission gears of the sub transmission is shifted to another one of the forward transmission gears in response to the shift operation, the clutch capacity of the clutch is set to zero if the engine speed exceeds the clutch release speed, and is then increased along with the reduction of the engine speed. Accordingly, it is possible to quickly suppress the increase of the engine speed and perform the transmission smoothly.

According to other embodiments of the present invention, the fuel injection to the cylinder of the engine is stopped when the engine speed exceeds the revolution limit speed and the ignition in the cylinder of the engine is stopped when the engine speed exceeds the upper limit speed, and the clutch release speed, the revolution limit speed, and the upper limit speed satisfy the relationship of revolution limit speed<clutch release speed<upper limit speed. Accordingly, the clutch can be engaged as much as possible so as not to give a feeling of slipping by the clutch release, with the engine speed being suppressed.

BRIEF DESCRIPTION OF THE DRAWINGS

FIG. 5 is view showing a correspondence table between shifting of a shift position and hydraulic pressure control.

DETAILED DESCRIPTION

A transmission control system of certain embodiments is described below in detail by showing certain embodiments, and by referring to the attached drawings.

Figure 1:
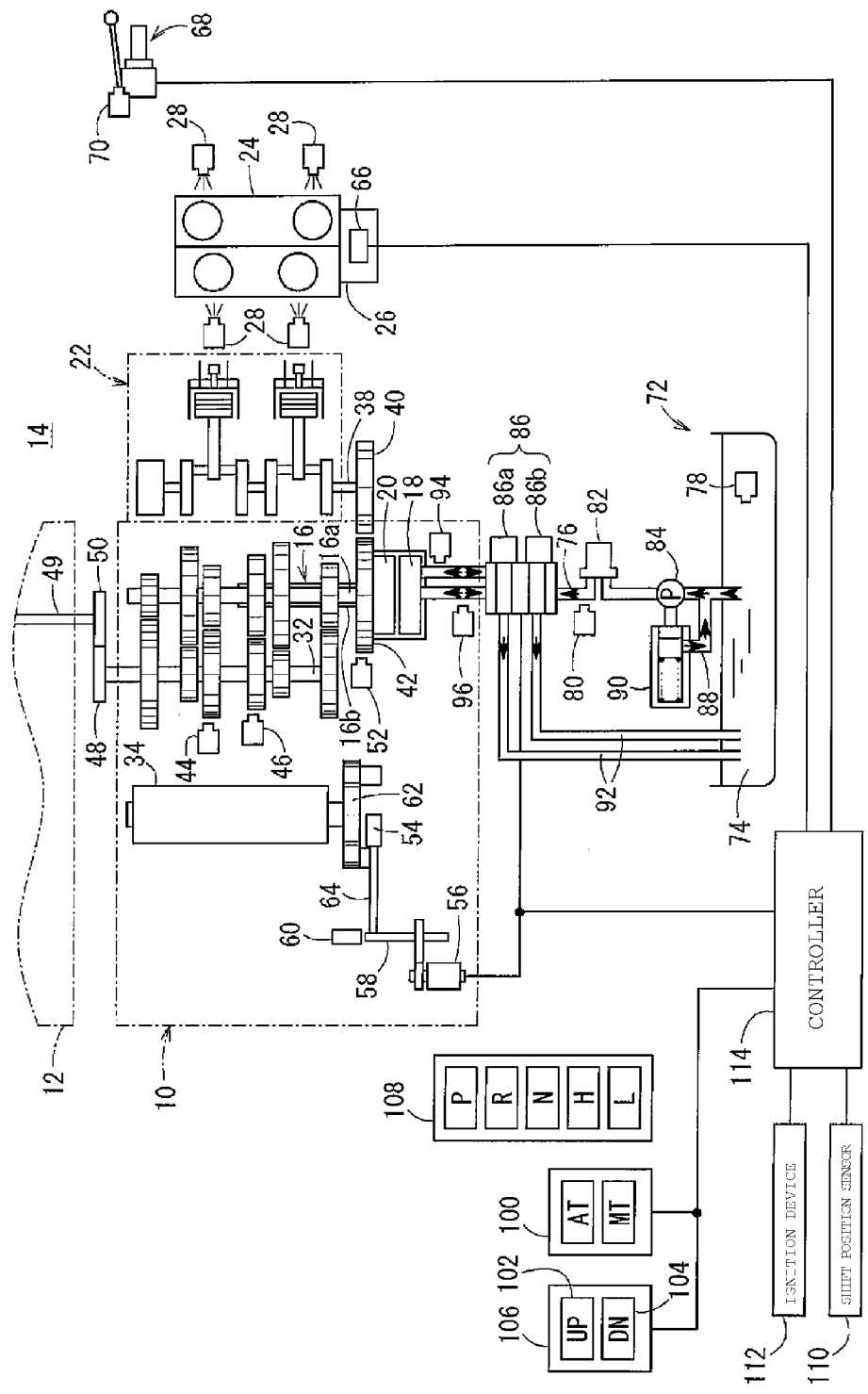
FIG. 1 is a configuration diagram of a transmission control system including a main transmission which is an automated manual transmission as an automatic transmission and a sub transmission which is a manual transmission.

FIG. 1 is a configuration diagram of a transmission control system 14 including a main transmission 10, which is an automated manual transmission as an automatic transmission, and a sub transmission 12 which is a manual transmission. The transmission control system 14 is mounted in a vehicle such as a motorcycle or an automobile. The main transmission 10 having multiple transmission gears (first to sixth speeds) is a dual-clutch transmission (DCT) in which transmission of a rotational driving force of an engine 22 is enabled and disabled by two clutches 18, 20 disposed on a main shaft 16. The engine 22 includes a throttle-by-wire type throttle body 24 and the throttle body 24 includes a motor 26 configured to open and close a not-illustrated throttle valve. A fuel injection device 28 configured to inject fuel is provided near the throttle body 24 for each of the cylinders.

Multiple gears forming the transmission gears of the main transmission 10 are each connected or freely fitted to the main shaft 16 or a counter shaft 32. The main shaft 16 is formed of an inner shaft 16a and an outer shaft 16b. The inner shaft 16a is connected to the clutch 18 and the outer shaft 16b is connected to the clutch 20. Gears which can be displaced in the axial directions of the main shaft 16 and the counter shaft 32 are provided respectively on the main shaft 16 and the counter shaft 32, and end portions of shift forks 36 engage with these gears and guide grooves (not illustrated) formed in a shift drum (see FIG. 2).

A primary drive gear 40 is connected to a crankshaft 38, which is an output shaft of the engine 22, and meshes with a primary driven gear 42. The primary driven gear 42 is connected to the inner shaft 16a via the clutch 18 and is connected to the outer shaft 16b via the clutch 20. The main transmission 10 includes an inner shaft rotation speed sensor 44 and an outer shaft rotation speed sensor 46, which detect rotation speeds of the inner shaft 16a and the outer shaft 16b by measuring the rotation speeds of certain transmission gears on the counter shaft 32, respectively.

An output gear 48 is connected to an end portion of the counter shaft 32 and an input gear 50 connected to an end portion of a main shaft 49 of the sub transmission 12 meshes with the output gear 48. The rotational driving force from the engine 22 is transmitted to a drive wheel (not illustrated) of the vehicle via the sub transmission 12.

The main transmission 10 is provided with an engine speed sensor 52 disposed to face an outer periphery of the primary driven gear 42, a gear position sensor 54 configured to detect the current transmission gear on the basis of the rotating position of the shift drum 34, and a spindle sensor 60 configured to detect the rotating position of a spindle 58 to detect the rotating amount of a shift control motor (actuator) 56. A rotational force of the shift control motor 56 is transmitted to the spindle 58 and then to a transmission rod 64 configured to rotate a shift drum gear 62.

The throttle body 24 is provided with a throttle valve opening-degree sensor 66 configured to detect an opening degree of the throttle valve. Moreover, the transmission control system 14 includes a throttle opening-degree sensor 70 configured to detect an operation amount of a throttle mechanism 68 used to give an instruction to accelerate the vehicle.

Oil in a clutch hydraulic system 72 is commonly used as lubricating oil for the engine 22 and hydraulic oil for driving the clutches 18, 20. The clutch hydraulic system 72 includes an oil tank 74 and a pipe line 76 for supplying the oil (hydraulic oil) in the oil tank 74 to the clutches 18, 20. A hydraulic pressure sensor 78 is provided in the oil tank 74. A line hydraulic pressure sensor 80, an oil filter 82, a hydraulic pump 84, which is a hydraulic pressure supplying source, and a valve 86, which is an actuator are provided on the pipe line 76. A regulator 90 for maintaining the hydraulic pressure to be supplied to the valve 86 to a constant value is disposed on a return pipe line 88 connected to the pipe line 76. The valve 86 includes a first valve 86a and a second valve 86b which independently supplies the hydraulic pressure to the clutches 18, 20. An oil return pipe line 92 is provided for each of the first valve 86a and the second valve 86b.

A first hydraulic pressure sensor 94 configured to measure the hydraulic pressure applied to the clutch 18 is provided on a pipe line connecting the first valve 86a and the clutch 18 to each other. Similarly, a second hydraulic pressure sensor 96 configured to measure the hydraulic pressure applied to the clutch 20 is provided on a pipe line connecting the second valve 86b and the clutch 20 to each other.

The transmission control system 14 is provided with a mode switch 100, which is used for switching between an automatic transmission (AT) mode and a manual transmission (MT) mode, a shift switch 106, which includes a shift-up switch 102 used to give an instruction of shift-up (UP) and a shift-down switch 104 used to give an instruction of shift-down (DN), and a shift lever 108, which is an example of a manual gear shift operation switching means, and which is used to select any one of shift ranges of parking (P), reverse (R), neutral (N), high (H), and low (L). Moreover, the transmission control system 14 includes a shift position sensor 110 configured to detect the selected transmission gear (shift position) of the sub transmission in response to an operation of the shift lever 108.

The transmission control system 14 includes a controller 114 configured to control the shift control motor 56, the valve 86, the fuel injection devices 28, an ignition device 112, and the like on the basis of output signals from the sensors described above (engine speed sensor 52, gear position sensor 54, throttle valve opening-degree sensor 66, and the like), operation signals from the mode switch 100 and the shift-down switch 104, and a detection signal from the shift position sensor 110. The ignition device 112 is used to perform ignition in each of the cylinders of the engine 22.

In the AT mode, the controller 114 automatically shifts the transmission gears of the main transmission 10 according to information such as a vehicle speed, the engine speed, and the opening degree of the throttle valve. Meanwhile, in the MT mode, the controller 114 shifts the transmission gears of the main transmission according to the operation of the shift switch 106. Even when the shift-down switch 104 is operated in the MT mode, the controller 114 can cancel the operation of the shift-down switch 104 in a case where the engine speed is estimated to rise to a predetermined engine speed due to the shift down. In other words, no gear shift action to shift down is performed.

When the first valve 86a or the second valve 86b is opened based on a drive signal from the controller 114, the clutch 18 or the clutch 20 is set to an engaged state with application of a hydraulic pressure. The primary driven gear 42 is thereby connected to the inner shaft 16a or the outer shaft 16b via the clutch 18 or the clutch 20. Meanwhile, when the first valve 86a or the second valve 86b is closed and the application of the hydraulic pressure is stopped, the clutch 18 or the clutch 20 is disengaged (released) by a biasing force of a return spring (not illustrated).

The shift control motor 56 rotates the shift drum 34 on the basis of a drive signal from the controller 114. When the shift drum 34 is rotated, the shift forks 36 are displaced in the axial direction of the shift drum 34, along the shapes of the aforementioned guide grooves formed in the outer periphery of the shift drum 34. This changes the meshing state of the gears on the counter shaft 32 and the main shaft 16 and the shift up or the shift down of the main transmission 10 is executed.

The main transmission 10 is configured such that the inner shaft 16a connected to the clutch 18 supports the odd-numbered transmission gears (first, third, and fifth speeds,) and the outer shaft 16b connected to the clutch 20 supports the even-numbered transmission gears (second, fourth, and sixth speeds). Accordingly, for example, when the vehicle is running in any of the odd-numbered gears, the hydraulic pressure is supplied to the clutch 18 and the engagement state between the clutch 18 and the primary driven gear 42 is maintained. In a case of performing shift change, since the meshing state of the gears is changed in advance by rotating the shift drum 34, the gear shift action can be completed only by changing the engagement states of both of the clutches 18, 20.

Figure 2:
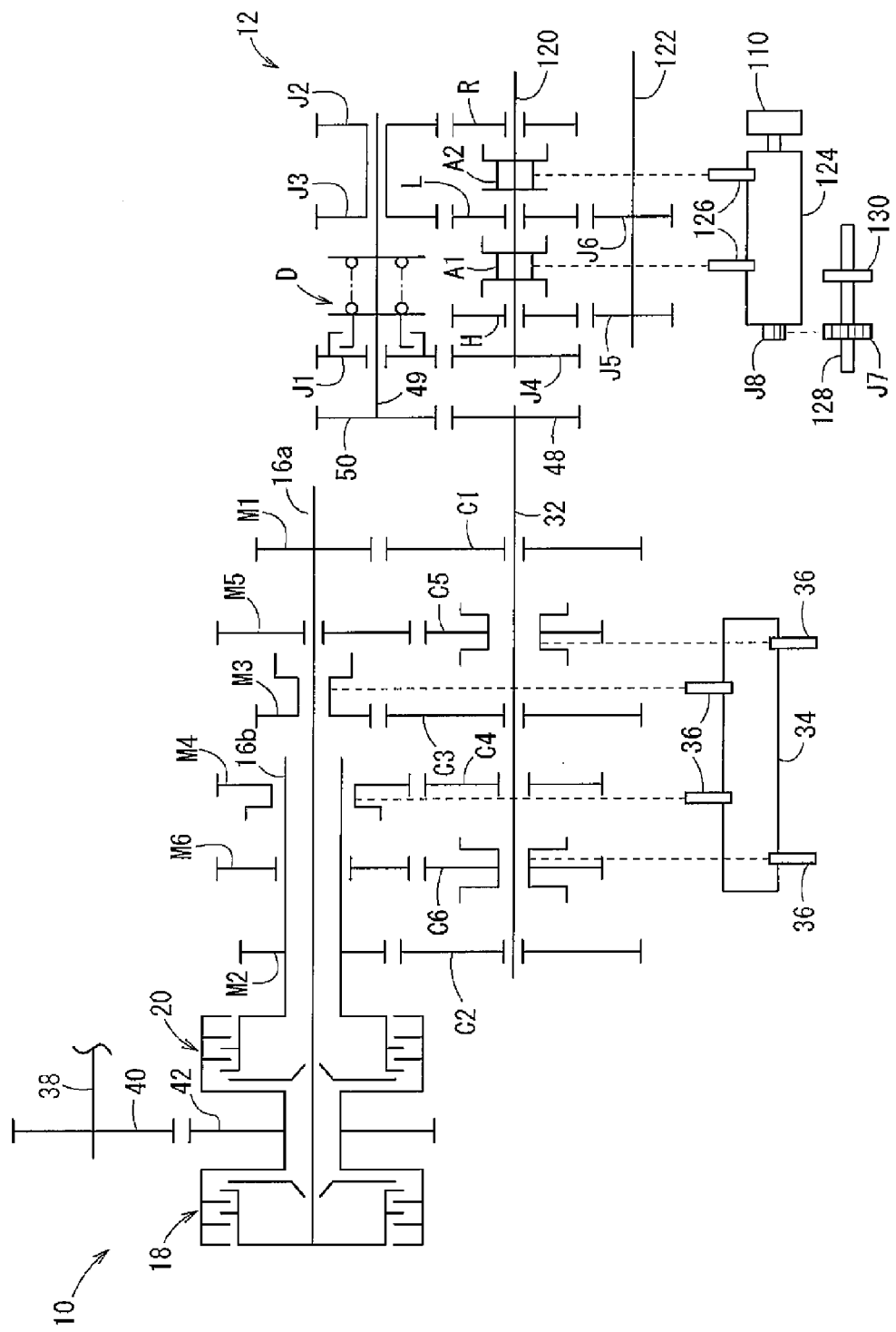
FIG. 2 is a skeleton diagram of the main transmission and the sub transmission.

FIG. 2 is a skeleton diagram of the main transmission 10 and the sub transmission 12. The inner shaft 16a connected to the clutch 18 supports odd-numbered transmission drive gears M1, M3, M5. The first transmission drive gear M1 is formed integrally with the inner shaft 16a. Moreover, the third transmission drive gear M3 is attached to be slidable in an axial direction and to be unrotatable relative to the inner shaft 16a in a circumferential direction while the fifth transmission drive gear M5 is attached to be unslidable in the axial direction and to be rotatable relative to the inner shaft 16a in the circumferential direction.

The outer shaft 16b connected to the clutch 20 supports even-numbered transmission drive gears M2, M4, M6. The second transmission drive gear M2 is formed integrally with the outer shaft 16b. Moreover, the fourth transmission drive gear M4 is attached to be slidable in the axial direction and to be unrotatable relative to the outer shaft 16b in the circumferential direction while the sixth transmission drive gear M6 is attached to be unslidable in the axial direction and to be rotatable relative to the outer shaft 16b.

The counter shaft 32 supports driven gears C1 to C6 configured to mesh with the drive gears M1 to M6, respectively. The first to fourth transmission driven gears C1 to C4 are attached to be unslidable in the axial direction and to be rotatable relative to the counter shaft in the circumferential direction while the fifth and sixth transmission driven gears C5, C6 are attached to be slidable in the axial direction and to be unrotatable relative to the counter shaft 32 in the circumferential direction. The shift forks 36 slides the drive gears M3, M4 and the driven gears C5, C6, which also function as transmission shifters, to engage and disengage dog clutches formed in the gears. The drive gears M1 to M6 and the driven gears C1 to C6 form the first to sixth speed transmission gears.

In the main transmission 10, for example, when the first speed transmission gear is selected, the rotational driving force of the engine 22 transmitted to the primary driven gear 42 from the crankshaft 38 is transmitted to the inner shaft 16a by the engagement of the clutch 18 and is then transmitted from the first transmission drive gear M1 to the counter shaft 32 via the first transmission driven gear C1. At this time, a first transmission dog clutch, i.e. a dog clutch between the first transmission driven gear C1 and the fifth transmission driven gear C5, is in a meshing state.

Then, while the rotational driving force is transmitted by the first transmission gears, the main transmission 10 prepares for shifting to the second speed by setting the second transmission dog clutch, i.e. the dog clutch between the sixth transmission driven gear C6 and the second transmission driven gear C2, to the meshing state. At this time, since the clutch 20 is disengaged, the rotational driving force of the engine 22 only rotates the outer shaft 16b via the second transmission drive gear M2 in an idle manner, even when the second transmission dog clutch is set to the meshing state while the vehicle is running in the first transmission gears. Then, the rotational driving force from the engine 22 can be instantaneously outputted via the transmission gears of the second speed when the engaged clutch is switched from the clutch 18 to the clutch 20.

The sub transmission 12 is a transmission in which the transmission gears can be mechanically shifted according to a shift operation of the shift lever 108, and the rotational driving force outputted from the main transmission 10 is transmitted to the main shaft 49 of the sub transmission 12 via the output gear 48 and the input gear 50. The main shaft 49 supports gears J1, J2, J3 and a torque damper D. The gears J1, J2, J3 are attached to be unslidable in the axial direction and to be rotatable relative to the main shaft 49 in the circumferential direction, and the gears J2, J3 are integrally formed. When the main shaft 49 is rotated, the rotational driving force thereof is transmitted to the gear J1 via the torque damper D and the gear J1 is rotated.

The rotational driving force of the gear J1 is transmitted to a sub shaft 120 of the sub transmission 12. The sub shaft 120 supports a gear J4 meshing with the gear J1, forward transmission gears H, L, a reverse transmission gear R, and transmission shifters A1, A2. The gear J4 is provided integrally with the sub shaft 120. The transmission gear H, the transmission gear L, and the transmission gear R are attached to be unslidable in the axial direction and to be rotatable relative to the sub shaft 120 in the circumferential direction. The transmission shifters A1, A2 are attached to be slidable in the axial direction and to be unrotatable relative to the sub shaft 120 in the circumferential direction. The transmission gear L meshes with the gear J3 and the transmission gear R meshes with the gear J2.

An output shaft 122 of the sub transmission 12 supports a gear J5 meshing with the transmission gear H and a gear J6 meshing with the transmission gear L. The gears J5, J6 are provided on the output shaft 122 to be integral with the output shaft 122. End portions of shift forks 126 engage with the transmission shifters A1, A2 and not-illustrated guide grooves formed in a shift drum 124 of the sub transmission 12. The shift drum 124 is provided with the shift position sensor 110 configured to detect the shift position of the sub transmission 12 by detecting the rotating amount of the shift drum 124.

A shift shaft 128 is rotated in accordance with the operation of the shift lever 108, and a gear J7 provided on the shift shaft 120 meshes with a gear J8 provided on the shift drum 124. Moreover, a parking brake stopper 130 is provided on the shift shaft 128. When the shift shaft 128 is rotated to a position corresponding to the shift range of "P" of the shift lever 108, the parking brake stopper 130 locks a not-illustrated parking gear and a parking brake is thereby activated.

When the shift range of "H" is selected by using the shift lever 108, the transmission shifter A1 slides in the axial direction and a dog of the transmission shifter A1 and a dog of the transmission gear H mesh with each other (transmission gear H is selected). The rotational driving force transmitted to the main shaft 49 is thereby transmitted to the output shaft 122 via the torque damper D, the gears J1, J4, the sub shaft 120, the transmission shifter A1, the transmission gear H, and the gear J5. Moreover, when the shift range of "L" is selected by using the shift lever 108, the transmission shifter A1 slides in the axial direction and the dog of the transmission shifter A1 and a dog of the transmission gear L mesh with each other (transmission gear L is selected). The rotational driving force transmitted to the main shaft 49 is thereby transmitted to the output shaft 122 via the torque damper D, the gears J1, J4, the sub shaft 120, the transmission shifter A1, the transmission gear L, and the gear J6. Note that the gear ratio of the sub transmission 12 in the case where the transmission gear L is selected is higher than that in the case where the transmission gear H is selected.

Furthermore, when the shift range of "R" is selected by using the shift lever 108, the transmission shifter A2 slides in the axial direction and a dog of the transmission shifter A2 and a dog of the transmission gear R mesh with each other (transmission gear R is selected). The rotational driving force transmitted to the main shaft 49 is thereby transmitted to the output shaft 122 via the torque damper D, the gears J1, J4, the sub shaft 120, the transmission shifter A2, the transmission gear R, the gears J2, J3, the transmission gear H, and the gear J6. The rotating direction of the output shaft 122 in the case where the transmission gear R is selected is opposite to that in the cases where the transmission gears L, H are selected. The rotational driving force of the output shaft 122 is transmitted to the drive wheel.

When "P" or "N" is selected by using the shift lever 108, the dogs of transmission shifters A1, A2 do not mesh with any of the dogs of the transmission gears H, L, R. However, when "P" is selected by using the shift lever 108 the parking brake is activated as described above.

Figure 3:
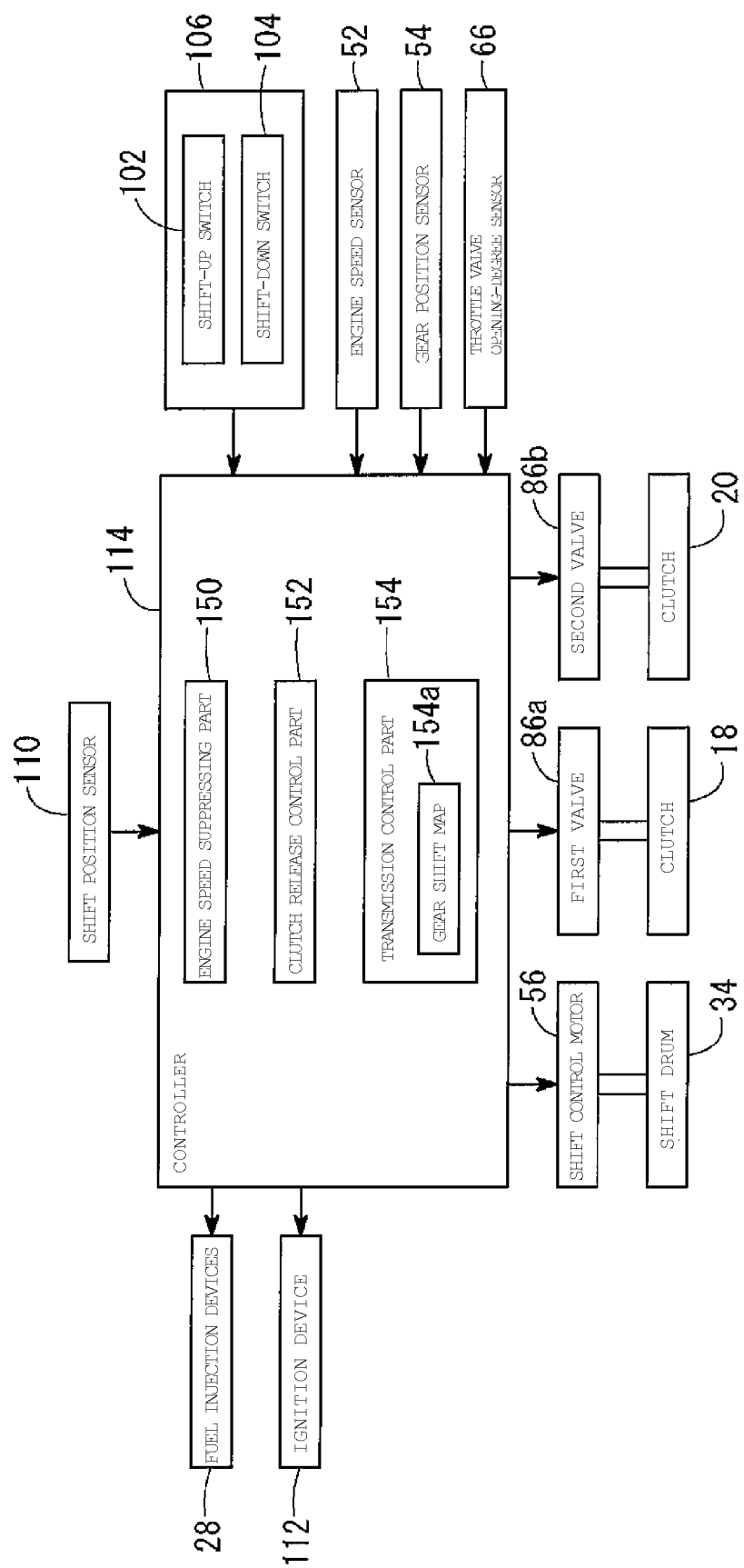
FIG. 3 is a configuration diagram of a controller in FIG. 1.

FIG. 3 is a configuration diagram of the controller 114 in FIG. 1. The controller 114 includes an engine speed suppressing part 150, a clutch release control part 152, and a transmission control part 154. The engine speed suppressing part 150 suppresses the engine speed when the transmission gear (shift position) of the sub transmission 12 is shifted from the transmission gear H to the transmission gear L or from the transmission gear L to the transmission gear H in response to the operation of the shift lever 108. The controller 114 can recognize this shifting on the basis of the shift position detected by the shift position sensor 110.

Specifically, when the shift position is shifted from the transmission gear H to the transmission gear L or from the transmission gear L to the transmission gear H in response to the operation of the shift lever 108 and the engine speed detected by the engine speed sensor 52 exceeds a revolution limit speed, the fuel injection by the fuel injection devices 28 is stopped (cut). Moreover, when the engine speed exceeds an upper limit speed which is higher than the revolution limit speed, the ignition by the ignition device 112 is stopped (cut). The fuel injection cut and the ignition cut is performed for all of the cylinders.

When the shift position is shifted from the transmission gear H to the transmission gear L or from the transmission gear L to the transmission gear H in response to the operation of the shift lever 108 and the engine speed detected by the engine speed sensor 52 exceeds a clutch release speed, the clutch release control part 152 drives the first valve 86a or the second valve 86b to reduce the hydraulic pressure applied to the currently-engaged clutch (clutch 18 or clutch 20), and thereby relax the engagement of the clutch (clutch 18 or clutch 20).

The clutch release speed is a value obtained by adding a first engine speed Ne1 to the revolution limit speed and the upper limit speed is a value obtained by adding a second engine speed Ne2 higher than the first engine speed Ne1 to the revolution limit speed. Accordingly, the value of the clutch release speed is higher than the value of the revolution limit speed and smaller than the value of the upper limit speed.

When the shift position is shifted from the transmission gear H to the transmission gear L or from the transmission gear L to any gear other than the transmission gear H in response to the operation of the shift lever 108, the clutch release control part 152 drives the first valve 86a and the second valve 86b to stop the application of the hydraulic pressure to the clutch 18 and the clutch 20 and thereby release the clutch 18 and the clutch 20 (disengage the clutch 18 and the clutch 20).

When the AT mode is selected by using the mode switch 100, the transmission control part 154 automatically executes a gear shift action of the main transmission 10 by driving the shift control motor 56 and the valve 86 (first valve 86a and second valve 86b), according to a gear shift map 154a, on the basis of the engine speed detected by the engine speed sensor 52, the opening degree of the throttle valve detected by the throttle valve opening-degree sensor 66, the gear position detected by the gear position sensor 54, and the like. When the MT mode is selected by using the mode switch 100, the transmission control part 154 executes the gear shift action of the main transmission 10 according to the operation of the shift switch 106.

Figure 4:
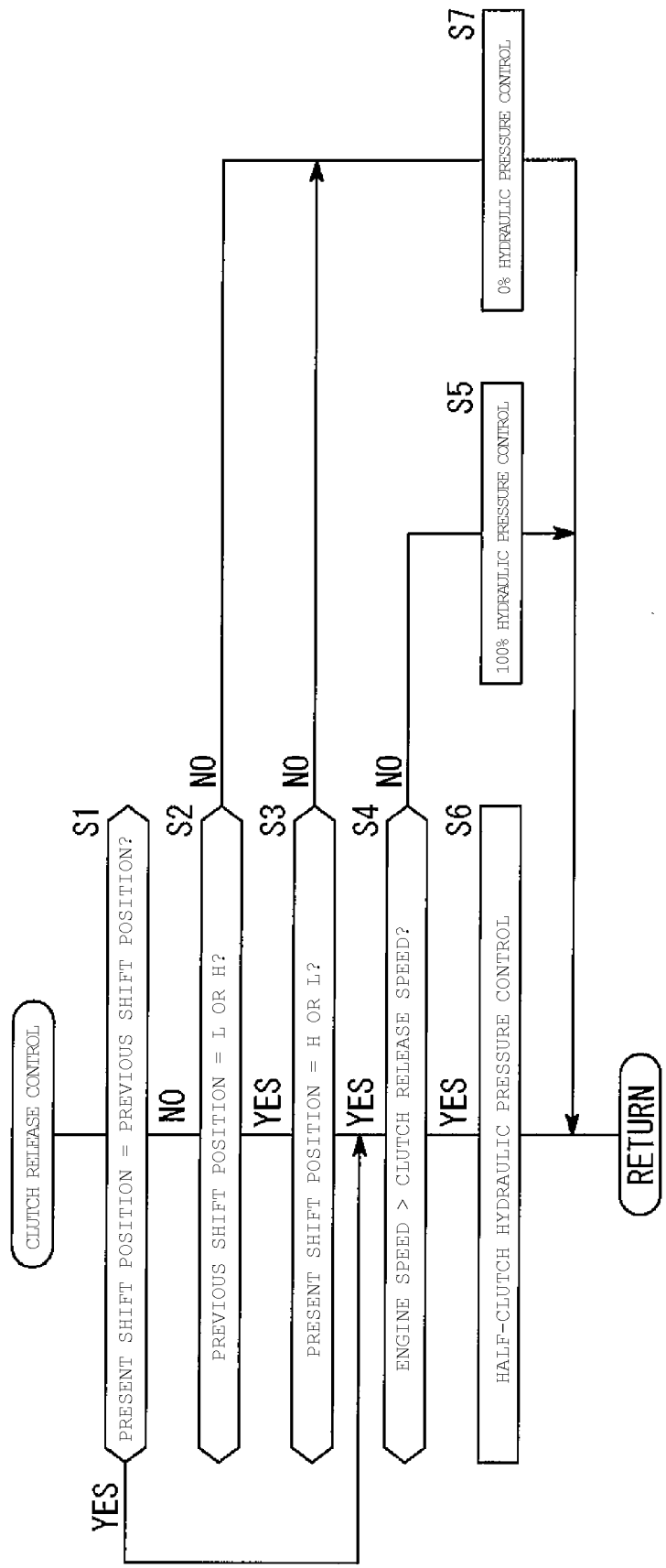
FIG. 4 is a flowchart showing actions of a clutch release control part.

Next, actions of the clutch release control part 152 are described according to the flowchart of FIG. 4. First, the clutch release control part 152 determines whether the present shift position detected by the shift position sensor 110 is the same as the previous shift position (step S1). In other words, in step S1, the clutch release control part 152 determines whether the shift operation has been performed by using the shift lever 108.

When the clutch release control part 152 determines that the present shift position is different from the previous shift position in step S1, the clutch release control part 152 determines whether the previous shift position is any one of the transmission gear L and the transmission gear H (step S2). When the previous shift position is the transmission gear L or the transmission gear H, the clutch release control part 152 determines whether the present shift position is any one of the transmission gear H and the transmission gear L (step S3). In other words, in steps S2 and S3, the clutch release control part 152 determines whether the shift position is shifted from the transmission gear L or the transmission gear H, to the transmission gear H or the transmission gear L, in response to the shift operation of the shift lever 108.

When the clutch release control part 152 determines that the present shift position is the transmission gear H or the transmission gear L in step S3 or that the present shift position is the same as the previous shift position in step S1, the clutch release control part 152 determines whether the engine speed is exceeding the clutch release speed (step S4).

When the clutch release control part 152 determines that the engine speed is not exceeding the clutch release speed in step S4, the clutch release control part 152 performs 100% hydraulic pressure control (step S5). Specifically, the clutch release control part 152 drives the first valve 86a or the second valve 86b to continuously apply a hydraulic pressure of 100% to the currently-engaged clutch (clutch 18 or clutch 20) (continuously maintain a state where the clutch capacity of the currently-engaged clutch is 100%) and thereby set the clutch to a completely-engaged state. The clutch capacity refers to a degree of the outputted rotational driving force relative to the rotational driving force inputted to the clutch. When the clutch capacity is 0%, the outputted rotational driving force is 0. When the clutch capacity is 100%, the inputted rotational driving force is entirely outputted.

Meanwhile, when the clutch release control part 152 determines that the engine speed is exceeding the clutch release speed in step S4, the clutch release control part 152 performs half-clutch hydraulic pressure control to relax the engagement of the currently-engaged clutch (clutch 18 or clutch 20) (step S6). This half-clutch hydraulic pressure control will be described later.

When the clutch release control part 152 determines that the previous shift position is neither the transmission gear L nor the transmission gear H in step S2 or that the present shift position is neither the transmission gear H nor the transmission gear L in step S3, the clutch release control part 152 performs 0% hydraulic pressure control (step S7). Specifically, the clutch release control part 152 drives the first valve 86*a* and the second valve 86*b* to apply a hydraulic pressure of 0% to the clutches 18, 20 (set the clutch capacity of the clutches 18, 20 to 0%) and thereby set the clutches 18, 20 to a completely released state.

FIG. 5 is view showing a correspondence table between the shifting of the shift position and the hydraulic pressure control. Circles in FIG. 5 indicate that the 0% hydraulic pressure control is performed and crosses indicate that the half-clutch hydraulic pressure control or the 100% hydraulic pressure control is performed.

As shown in FIG. 5, when the shift position before the gear shift operation is the transmission gear L and the shift position after the operation is the transmission gear H or when the shift position before the operation is the transmission gear H and the shift position after the operation is the transmission gear L, the half-clutch hydraulic pressure control is executed if the engine speed exceeds the clutch release speed. Note that the 100% hydraulic pressure control is executed if the engine speed does not exceed the clutch release speed.

Meanwhile, when the shift position before the operation is the transmission gear R and the shift position after the operation is the parking (P), the neutral (N), the transmission gear H, or the transmission gear L or when the shift position before the operation is the transmission gear H or the transmission gear L and the shift position after the operation is the parking (P), the neutral (N), or the transmission gear R, the 0% hydraulic pressure control is executed. Since the 0% hydraulic pressure control is executed when a gear shift operation like those described above is performed, a shift shock can be suppressed even when a gear shift action with a large shift shock is performed. Note that the 0% hydraulic pressure control is not executed when the shift position before the operation is the parking (P) or the neutral (N), because the sub transmission 12 is already set to the neutral state.

Figure 6A:
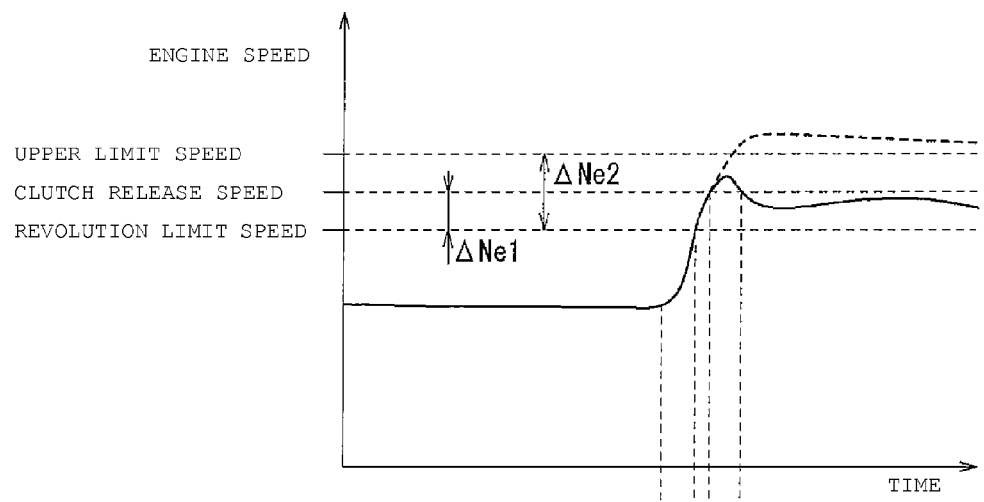
FIG. 6A is a time chart showing an engine speed in a case where the shift position is shifted from a transmission gear H to a transmission gear L in response to a shift operation of a shift lever.
Figure 6B:
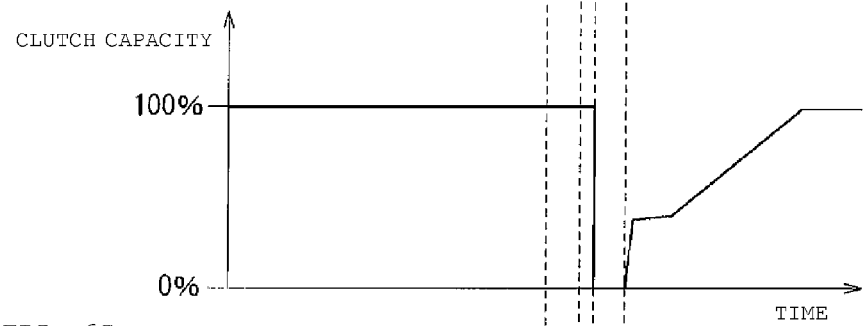
FIG. 6B is a time chart showing a clutch capacity of a clutch in the case where the shift position is shifted from the transmission gear H to the transmission gear L in response to the operation of the shift lever.
Figure 6C:
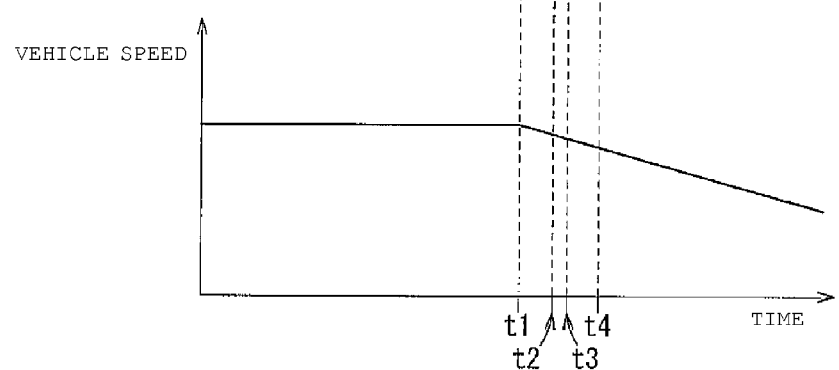
FIG. 6C is a time chart showing a vehicle speed in the case where the shift position is shifted from the transmission gear H to the transmission gear L in response to the operation of the shift lever.

FIG. 6A is a time chart showing the engine speed in the case where the shift position is shifted from the transmission gear H to the transmission gear L in response to the shift operation of the shift lever 108. FIG. 6B is a time chart showing the clutch capacity of the clutch 18 or the clutch 20 in the case where the shift position is shifted from the transmission gear H to the transmission gear L in response to the operation of the shift lever 108. FIG. 6C is a time chart showing a vehicle speed in the case where the shift position is shifted from the transmission gear H to the transmission gear L in response to the operation of the shift lever 108. Description of FIGS. 6A to 6C is given below under the assumption that the clutch 18 is engaged and the clutch 20 is disengaged.

As shown in FIG. 6A, when the shift range is shifted from "H" to "L" in response to the shift operation of the shift lever 108, the transmission gear of the sub transmission 12 is shifted from the transmission gear H to the transmission gear L and the engine speed thereby increases. The timing at which the shift position is shifted from the transmission gear H to the transmission gear L is denoted by t1. Moreover, since the transmission gear of the sub transmission 12 is shifted from the transmission gear H to the transmission gear L, the speed of the vehicle starts to gradually decrease from the timing t1.

The 100% hydraulic pressure control is executed by the clutch release control part 152 (step S5 of FIG. 4) until the engine speed exceeds the clutch release speed. In other words, the hydraulic pressure of 100% is continuously applied to the currently-engaged clutch, i.e. the clutch 18. Note that the hydraulic pressure of 0% is continuously applied to the clutch 20 and the clutch 20 is thereby released.

When the engine speed exceeds the revolution limit speed after the timing t1, the engine speed suppressing part 150 cuts the fuel injection by the fuel injection devices 28 for all of the cylinders, and thereby suppresses an increase of the engine speed. The timing at which the engine speed exceeds the revolution limit speed is denoted by t2. Then, the half-clutch hydraulic pressure control is executed by the clutch release control part 152 to relax the engagement of the clutch 18 (step S6 of FIG. 4), only when the engine speed increases even after the cut of fuel injection and exceeds the clutch release speed. The timing at which the engine speed exceeds the clutch release speed is denoted by t3.

The half-clutch hydraulic pressure control is described by using FIG. 6B. In the half-clutch hydraulic pressure control, when the engine speed exceeds the revolution limit speed, the hydraulic pressure supplied to the clutch 18 is first changed from 100% to 0% to temporarily set the clutch capacity of the clutch 18 to 0%. At this time, the clutch 18 and the clutch 20 are both disengaged. The engine 22 and the sub transmission 12 are thereby disconnected and the increase of the engine speed can be quickly suppressed.

Then, when the engine speed falls to or below the revolution limit speed, a predetermined amount of hydraulic pressure is applied to the clutch 18 to increase the clutch capacity of the clutch 18 by a predetermined amount. At this time, the clutch 18 is in a so-called half-clutch state (state where the clutch is not completely engaged). The timing at which the engine speed falls to or below the revolution limit speed is denoted by t4. Thereafter, the hydraulic pressure applied to the clutch 18 is increased along with the reduction of the engine speed or the elapse of time to gradually increase the clutch capacity of the clutch 18, and the clutch capacity of the clutch 18 is eventually set to 100% (the clutch 18 is completely engaged). The gear shift action can be thereby smoothly performed.

When the engine speed further increases after exceeding the clutch release speed and exceeds the upper limit speed, the engine speed suppressing part 150 cuts the ignition by the ignition device 112 in all of the cylinders. This causes the engine 22 to stop and the engine speed thereby decreases. In this case, when the engine speed falls to or below the clutch release speed, a predetermined amount of hydraulic pressure is applied to the clutch 18 to increase the clutch capacity of the clutch 18 by a predetermined amount.

As described above, when the sub transmission 12 having the transmission gears mechanically shiftable in response to the shift operation of the shift lever 108 is shifted from one forward transmission gear to another, the engagement of the clutch is relaxed if the engine speed exceeds the clutch release speed. Accordingly, it is possible to suppress the increase of the engine speed due to the gear shift action of the sub transmission 12 having the mechanically shiftable transmission gears.

The clutches 18, 20 are released regardless of the engine speed when a shift operation other than the operation to shift a forward transmission gear of the sub transmission 12 to another forward transmission gear is performed. Accordingly, even when a gear shift action with a large shift shock is performed, the shift shock can be reduced.

When a forward transmission gear of the sub transmission 12 is shifted to another forward transmission gear in response to the shift operation, the clutch capacity of the engaged clutch is temporarily set to zero if the engine speed exceeds the clutch release speed, and is then increased along with the reduction of the engine speed. Accordingly, it is possible to quickly suppress the increase of the engine speed and perform the transmission smoothly.

The fuel injection for all of the cylinders of the engine 22 is stopped when the engine speed exceeds the revolution limit speed, the ignition in all of the cylinders of the engine 22 is stopped when the engine speed exceeds the upper limit speed, and the clutch release speed, the revolution limit speed, and the upper limit speed satisfy a relationship of revolution limit speed<clutch release speed<upper limit speed. Accordingly, the clutch can be engaged as much as possible so as not to give a feeling of slipping by the clutch release, with the engine speed being suppressed.

In the embodiment described above, the sub transmission 12 includes two transmission gears of the transmission gears H, L as the forward transmission gears. However, the sub transmission 12 may include three or more forward transmission gears.

Certain embodiments of the present invention have been described above, but the technical scope of the present invention is not limited to the scope described in the above embodiments. It is apparent to those skilled in the art that various modifications or improvements can be made to the above embodiments. Embodiments to which such modifications or improvements are made can be also included in the technical scope of the present invention, as is apparent from the scope of claims. Moreover, reference numerals in parentheses in the scope of claims are denoted in accordance with the reference numerals in the attached drawings to facilitate the understanding of the present invention. It should not be interpreted that the present invention is limited by the elements to which the reference numerals are attached.

EXPLANATION OF THE REFERENCE NUMERALS

10 MAIN TRANSMISSION
12 SUB TRANSMISSION
14 TRANSMISSION CONTROL SYSTEM
18, 20 CLUTCH
22 ENGINE
28 FUEL INJECTION DEVICE
52 ENGINE SPEED SENSOR
56 SHIFT CONTROL MOTOR
72 CLUTCH HYDRAULIC SYSTEM
86 VALVE
86A FIRST VALVE
86B SECOND VALVE
100 MODE SWITCH
102 SHIFT-UP SWITCH
104 SHIFT-DOWN SWITCH
106 SHIFT SWITCH
108 SHIFT LEVER
110 SHIFT POSITION SENSOR
112 IGNITION DEVICE
114 CONTROLLER
150 ENGINE SPEED SUPPRESSING PART
152 CLUTCH RELEASE CONTROL PART
154 TRANSMISSION CONTROL PART
154a GEAR SHIFT MAP

I claim:

1. A transmission control system, comprising:
a main transmission to which a rotational driving force of an engine is transmitted via a clutch, the main transmission having a plurality of transmission gears;
a sub transmission having at least two forward transmission gears mechanically shiftable in response to a shift operation; and
a controller configured to shift the transmission gears of the main transmission by activating an actuator, the controller also configured to control the clutch configured to enable and disable transmission of the rotational driving force of the engine,
wherein when one of the forward transmission gears of the sub transmission is shifted to another one of the forward transmission gears in response to the shift operation, the controller is configured to relax engagement of the clutch if an engine speed exceeds a clutch release speed,
wherein the controller is configured to stop fuel injection to a cylinder of the engine when the engine speed exceeds a revolution limit speed, and stop ignition in the cylinder of the engine when the engine speed exceeds an upper limit speed, and
wherein the clutch release speed, the revolution limit speed, and the upper limit speed satisfy a relationship of revolution limit speed<clutch release speed<upper limit speed.

2. The transmission control system according to claim 1, wherein the controller is configured to release the clutch regardless of the engine speed when another shift operation other than the operation to shift one of the forward transmission gears of the sub transmission to another one of the forward transmission gears is performed.

3. The transmission control system according to claim 1, wherein when one of the forward transmission gears of the sub transmission is shifted to another one of the forward transmission gears in response to the shift operation, the controller is configured to set a clutch capacity of the clutch to zero if the engine speed exceeds the clutch release speed, and then increase the clutch capacity along with a reduction of the engine speed.

4. A transmission control system, comprising:
a transmitting means for transmitting rotational driving force of an engine via a power transmitting means, the transmitting means having a plurality of transmission gears;
a gear shifting means for performing gear shifting having at least two forward transmission gears mechanically shiftable in response to a shift operation; and
a controlling means for controlling shifting of the transmission gears of the transmitting means by activating an actuating means, the controlling means configured to control the power transmitting means configured to enable and disable transmission of the rotational driving force of the engine,
wherein when one of the forward transmission gears of the gear shifting means is shifted to another one of the forward transmission gears in response to the shift operation, the controlling means is configured to relax engagement of the power transmitting means if an engine speed exceeds a clutch release speed,
wherein the controlling means is configured to stop fuel injection to a reciprocating means of the engine when the engine speed exceeds a revolution limit speed, and stop ignition in the reciprocating means of the engine when the engine speed exceeds an upper limit speed, and wherein the clutch release speed, the revolution limit speed, and the upper limit speed satisfy a relationship of revolution limit speed<clutch release speed<upper limit speed.

5. The transmission control system according to claim 4, wherein the controlling means is configured to release the power transmitting means regardless of the engine speed when another shift operation other than the operation to shift one of the forward transmission gears of the gear shifting means to another one of the forward transmission gears is performed.

6. The transmission control system according to claim 4, wherein when one of the forward transmission gears of the gear shifting means is shifted to another one of the forward transmission gears in response to the shift operation, the controlling means is configured to set a clutch capacity of the power transmitting means to zero if the engine speed exceeds the clutch release speed, and then increase the clutch capacity along with a reduction of the engine speed.

7. A method of controlling a transmission control system, the method comprising:
    transmitting rotational driving force of an engine via a clutch to a main transmission, the main transmission having a plurality of transmission gears;
    performing gear shifting with a sub transmission having at least two forward transmission gears mechanically shiftable in response to a shift operation;
    controlling shifting of the transmission gears of the main transmission with a controller by activating an actuator, the controller also configured to control the clutch configured to enable and disable transmission of the rotational driving force of the engine,
    wherein when one of the forward transmission gears of the sub transmission is shifted to another one of the forward transmission gears in response to the shift operation, the controller is configured to relax engagement of the clutch if an engine speed exceeds a clutch release speed,
    wherein the controller is configured to stop fuel injection to a cylinder of the engine when the engine speed exceeds a revolution limit speed, and stop ignition in the cylinder of the engine when the engine speed exceeds an upper limit speed, and
    wherein the clutch release speed, the revolution limit speed, and the upper limit speed satisfy a relationship of revolution limit speed<clutch release speed<upper limit speed.

8. The method according to claim 7, wherein the controller is configured to release the clutch regardless of the engine speed when another shift operation other than the operation to shift one of the forward transmission gears of the sub transmission to another one of the forward transmission gears is performed.

9. The method according to claim 7, wherein when one of the forward transmission gears of the sub transmission is shifted to another one of the forward transmission gears in response to the shift operation, the controller is configured to set a clutch capacity of the clutch to zero if the engine speed exceeds the clutch release speed, and then increase the clutch capacity along with a reduction of the engine speed.

* * * * *